United States Patent [19]
Kunze

[11] 4,135,783
[45] Jan. 23, 1979

[54] DEVICE FOR FORMING A DETACHABLE CONNECTION BETWEEN A WAVEGUIDE AND ANOTHER OPTICAL COMPONENT

[75] Inventor: Dieter Kunze, Neuried, Germany

[73] Assignee: Siemens Aktiengesellschaft, Berlin & Munich, Germany

[21] Appl. No.: 797,245

[22] Filed: May 16, 1977

[30] Foreign Application Priority Data
May 20, 1976 [DE] Fed. Rep. of Germany ....... 2622607

[51] Int. Cl.² ................................................ G02B 5/14
[52] U.S. Cl. ............................ 350/96.21; 350/96.17; 350/96.22
[58] Field of Search ............. 350/96.15, 96.17, 96.20, 350/96.21, 96.22

[56] References Cited
U.S. PATENT DOCUMENTS

| | | | |
|---|---|---|---|
| 3,885,859 | 5/1975 | Dalgleish et al. | 350/96.21 |
| 3,912,574 | 10/1975 | Cherin et al. | 350/96.15 X |
| 4,045,121 | 8/1977 | Clark | 350/96.20 |
| 4,046,453 | 9/1977 | Fiebelkorn et al. | 350/96.21 |
| 4,047,283 | 9/1977 | Kunze | 350/96.21 X |

Primary Examiner—John K. Corbin
Assistant Examiner—John D. Lee
Attorney, Agent, or Firm—Hill, Gross, Simpson, Van Santen, Steadman, Chiara & Simpson

[57] ABSTRACT

A device for forming a detachable connection between a waveguide and another optical component or waveguide characterized by a coupling section and at least one plug. Each plug comprises a base member having a trough-shaped cross section with a pair of spaced, upstanding shanks at one end of the base member and a flap member secured to the base member with a portion covering an opening between the shanks and movable therefrom. Each plug member receives at least one waveguide and engages the protective sheathing so that the waveguide is secured therein with a free end of the waveguide, which end has the protective sheath removed, extending between the spaced shanks at the one end. The coupling section has means for guiding a plug in a linear path as it is inserted in the coupling section and means forming a centering groove which extends into the path of each plug at an acute angle thereto so that as the plug is inserted in the coupling section, the free end of each waveguide, which is secured in the plug, is received in the centering groove and deflected thereby to move therealong to a position for forming an optical contact with the optical component. If the optical component is a transmission or reception diode, the coupling section has a plane surface extending perpendicular to the axis of the centering groove so that when the optical component is held on the plane surface, the waveguide will be perpendicular to the active surface and contact it to the same optical axis. When the optical component is another waveguide, the device will have a pair of means for guiding each of the plugs with the means forming the centering groove disposed therebetween and extending at an acute angle to both guide means.

10 Claims, 12 Drawing Figures

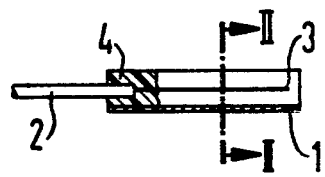
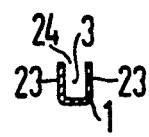
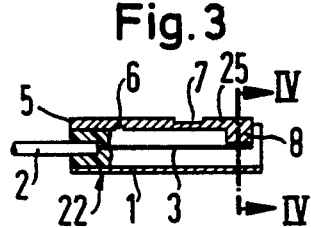
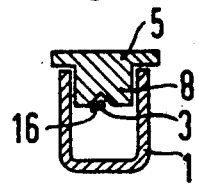
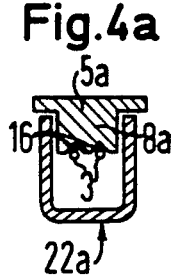
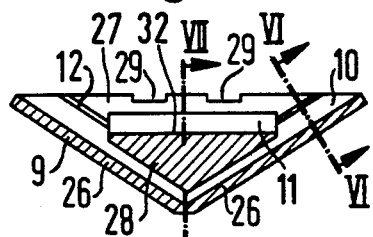
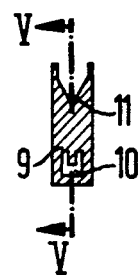
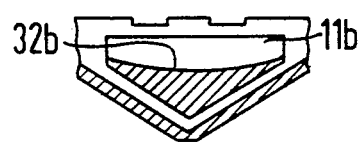

DEVICE FOR FORMING A DETACHABLE CONNECTION BETWEEN A WAVEGUIDE AND ANOTHER OPTICAL COMPONENT

BACKGROUND OF THE INVENTION

1. Field of the Invention

The present invention is directed to a device for forming a detachable connection between a waveguide and an optical component or between a pair of waveguides.

2. Prior Art

A multiplicity of arrangements are known for devices to provide a connection between waveguides. Because of the small diameter of the waveguides, problems of mutual alignment and centering are always present. Generally, an adjustment of the positions of the waveguides or an alignment of one waveguide relative to the other is necessary in order to minimize the transmission losses at the junction point or connection. Since an elimination of tolerance in the position of the waveguides in the device must occur, particular difficulties occur with regard to a device for forming a detachable connection.

In previously known and used plug connection arrangements, for forming detachable connections, the light waveguides are exactly positioned and fixed in place in an outer sleeve of the plug. In order to form a connection between two plugs, a coupling sleeve is utilized and this sleeve must receive the plugs without any play. In many cases, such as described in the German Offenlegungsschrift No. 24 09 057, which corresponds to British patent specification No. 1,455,102, capillary tubes are also used for receiving the ends of the light waveguides to be coupled together. These capillary tubes are then set into the plug devices.

Devices for forming connections which devices use prismatic grooves for providing alignment between the light waveguides have been suggested. Such a type of plug connection is disclosed in German Gebrauchsmuster No. 75 10 132.

A detachable connection of light waveguides, which uses adjustment devices and measuring steps which are connected therewith is very expensive. In addition, the desired alignment of the waveguides is problematical.

SUMMARY OF THE INVENTION

The present invention is directed to providing a device for forming a detachable connection arrangement for a light waveguide with either an otical component or another light waveguide to which device complicated adjustment and measuring steps are not necessary and the necessary steps for alignment of the waveguides occur by themselves during the plugging-in operation without further auxiliary measures. Furthermore, the device of the present invention guarantees that the light waveguide ends, which are held in the plugs, are protected during an unplugged state as well as during the plugging-in operation itself so that damage of the waveguides is minimized or precluded.

To accomplish these tasks, the present invention is directed to a device for detachably connecting at least one light waveguide having a protective sheathing to another optical component, said device comprises a coupling section and at least one plug, said plug comprising a base member having a trough-shaped cross section with a pair of spaced, upstanding shanks at one end of the base member, and a flap member secured to said base member with a portion covering the space between the pair of shanks at said one end of the base member and being movable from a position covering said shanks, said plug member receiving at least one light waveguide and engaging the protective sheathing so that the waveguide is secured therein with a free end of the waveguide, which end has the protective sheathing removed, extending between the spaced shanks at the said one end of the base member, said coupling section having means for guiding the plug in a linear path as it is inserted into the coupling section and means forming a centering groove extending into the path of each plug at an acute angle thereto so that as the plug is inserted into the coupling section, the free end of each of the waveguides secured in the plug is received in a centering groove and deflected thereby to move therealong to a position for forming an optical contact with the optical component.

When the optical component has a plane optical contact surface, the coupling section has a surface extending perpendicular to the base of the centering groove and means for holding the optical component on said plane surface so that the contact surface of the optical component extends perpendicular to the axis of the free end of the waveguide at the position of the optical contact. When the optical component comprises a set of at least one waveguide having a protective sheathing, then the device includes a plug for receiving the set and the coupling section has a pair of separate means for guiding a plug in a linear path as it is inserted into the coupling section with the means for forming the centering groove extending between said pair of separate means and into each of the paths of each plug at an acute angle so that as the plugs are inserted into the coupling section, the free ends of each of the waveguides secured therein are received in the centering groove, and are deflected thereby to move therealong to a position for forming an optical contact with the waveguides carried in the other plug.

An essential aspect of the invention is to be seen in the fact that the light waveguide end is arranged freely and approximately centrally in the trough or U-shaped base section of the plug and is protected by the flap which automatically raises itself when the plug is inserted and secured in the coupling section. Furthermore, it is essential with regard to the coupling section that during a plugging-in operation, the plug is moved at an acute angle toward the centering groove arranged in the coupling section so that the free end of the light waveguide is received by the centering groove, centered and aligned to a desired position. The second plug is introduced or inserted in a similar manner at an opposite side of the centering groove so that the two free ends of the waveguides which are received in the centering groove come to an interfacing contact. Since the engagement of each of the free ends of the centering groove will cause a bending of the waveguide and provide some compensation for different lengths of the free end, the length tolerances of the free ends of the light waveguides are not critical in the present device. If each of the free ends of each waveguide has a clean fractured end surface, which is producible by means of known cutting devices, before assembly into the plugs, the end surfaces of the free ends of the light waveguides do not require any grinding or polishing steps.

The coupling section can also be embodied as a carrier for an immersion substance as a result of which the transmission quality at the junction point between the two waveguides is further improved. Thus, the centering groove provides means for receiving an immersion substance at the point of contact between the two waveguides or in the case of an optical component at the point of contact of the end of the waveguide and the surface of the optical component.

Tolerances for the means for guiding which form the plug guide are also not critical and the means for forming the plug guide can be either an inside surface which engages an outside surface of the plug or an outside surface of the coupling section which is received within the plug as it is assembled or inserted on the coupling section. The only important fact is that the centering grooves have a longitudinal dimension which extends deep enough into the trough-shaped recess of the inserted plugs so that during insertion, the free ends of the light waveguides are threaded into the centering grooves as the base portion of each plug is pushed diagonally passed the ends of the means forming the centering groove far enough so that the free ends of the waveguides are in approximately the middle of the centering groove. To eliminate the danger of a springing-out of an inserted light waveguide end from the centering groove, one embodiment of the centering groove has a bottom which has a concave curvature in the longitudinal direction so that the low point of the bottom is located approximately at the contact point between the two light waveguide ends.

The principles of the present invention provide additional advantages which include that several parallel extending light waveguides can be secured in each of the plugs and that the means forming the centering groove provides a centering groove for each of the waveguides in the plug. Because of the generous tolerances of the device, this arrangement provides a multiple arrangement within the plug connection which is particularly significant for interconnecting cables which have several light waveguide strands. In addition, each of the devices can have means provided on the coupling section which enable assemblying a plurality of devices in juxtaposition without uncomplicated mechanical assemblies to form a multiple plug-in unit to handle a plurality of individual elements.

BRIEF DESCRIPTION OF THE DRAWINGS

FIG. 1 is a longitudinal cross section with portions in elevation of a base member of a plug of the present invention receiving a waveguide;

FIG. 2 is a cross-sectional view taken along lines II—II of FIG. 1;

FIG. 3 is a longitudinal cross section with portions in elevation for purposes of illustration of the plug in accordance with the present invention;

FIG. 4 is a cross-sectional view taken along lines IV—IV of FIG. 3;

FIG. 4A is a cross-sectional view similar to FIG. 4 of an embodiment of the plug of the present invention;

FIG. 5 is a longitudinal cross-sectional view taken on line V—V of FIG. 7;

FIG. 6 is a cross section taken along line VI—VI of FIG. 5;

FIG. 7 is a cross section taken along line VII—VII of FIG. 5;

FIG. 10 is a partial longitudinal cross section illustrating a configuration of a modification of the centering groove in accordance with the present invention; and FIG. 11 is a cross-sectional view similar to FIG. 7 of an embodiment of the present invention.

DESCRIPTION OF THE PREFERRED EMBODIMENT

Figure 8:
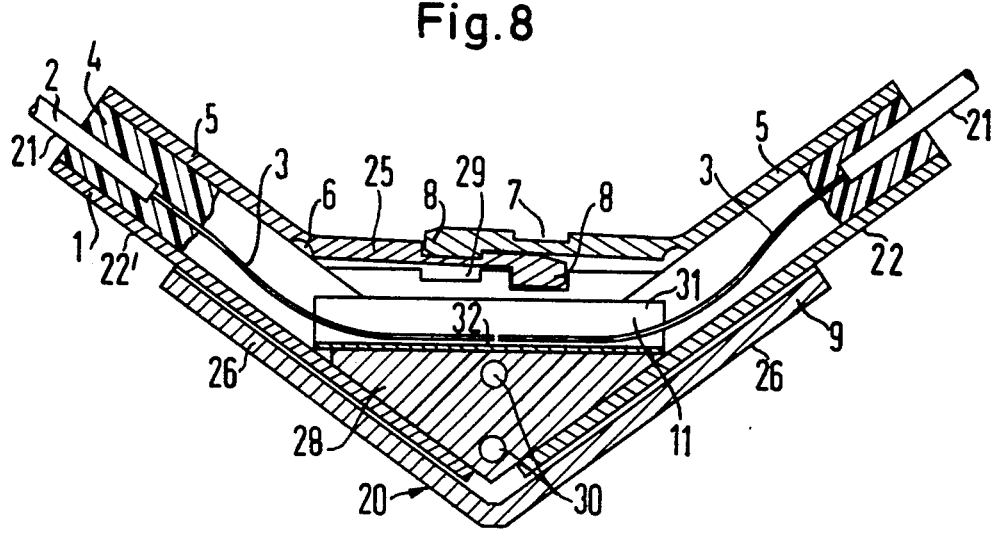
FIG. 8 is a cross-sectional view of the device of the present invention with portions in elevation for purposes of illustration.

The principles of the present invention are particularly useful in a device for detachably connecting a pair of waveguides 21. Each of the waveguides 21 is illustrated as an optical fiber waveguide having a core or optical fiber 3 which is surrounded by a protective cladding or sheathing 2. The device 20 comprises a coupling section 9 which receives a detachable plug 22.

As best illustrated in FIGS. 1, 2, 3 and 4, the detachable plug 22 comprises a base member 1, which has a trough-shaped or U-shaped cross section to provide a pair of upstanding shanks or edge portions 22, 23 (FIG. 2) and an opening 24 along one side thereof. At least one waveguide 21 is secured in the base member 1 by an adhesive 4 encapsulating the protective sheathing 2 and has a portion of the core 3 which has the sheathing stripped therefrom. The adhesive secures the waveguide 21 in the base member 1 so that exposed core 3 extends in the space between the pair of spaced shanks 23, 23. To protect the free end of the waveguides formed by the sheathing-free core 3, a flap 5 is secured on the base member 1 to cover the opening 24. As illustrated, the flap 5 is secured adjacent the adhesive 4 and is provided with a film hinge or integral hinge 6 so that a portion 25 is free to move from a position closing the opening 24 adjacent one end. As illustrated, the portion 25 of the flap 5 is provided with a locking dog or projection 8, which extends between the pair of shanks 23, 23 to a point for engaging a free end of the core 3. In addition to the locking dog 8, each portion 25 is provided with means for engaging or receiving the dog which is illustrated as a recess 7. The locking projection or dog 8 will coact with other engagement means for locking or holding the plug within the coupling section 9, which will be discussed hereinafter. As best illustrated in FIG. 4, the locking dog or projection 8 in addition to securing the plug in the coupling section 9 provides an additional feature of providing an oscillation dampening for the free end of the core 3 of the waveguide 21. This protection for the waveguide 3 can be increased even more by providing a longitudinally extending groove 16 in the dog 8 as illustrated in FIG. 4.

While the plug 22 of FIGS. 3 and 4 is illustrated as supporting a single waveguide, each plug can be built to support more than one waveguide. As illustrated in FIG. 4A, a plug 22a having a base member 1, which has a trough-shaped or U-shaped cross section with shanks has the opening 24 closed by a flap 5a. As illustrated, the locking projection or dog 8a is provided with a pair of parallel extending notch-shaped grooves 16 with one groove receiving each of the free ends or cores 3 of two parallel extending waveguides.

The coupling section 9, as illustrated in FIG. 5, has a triangular cross section having bottom walls 26, 26 extending at an angle to each other and merging with a pair of spaced side walls 27, 27 (FIG. 6). Adjacent the apex of the bottom walls 26, 26 a member 28 is provided and acts as means forming a centering groove 11. As illustrated in FIG. 7, the member 28 is integral with the side walls 27, 27; however, spacing is provided to form a socket for receiving the U-shaped base member 1 of each of the plugs 22. Each of the side walls 27, 27 is provided with supporting shoulders 12 which extend past the centering groove 11 at an actue angle. Thus, the shoulders coacting along with the space adjacent the bottom walls 26, 26 to provide plug guides 10 which act as means for guiding the plug along a linear or straight line path as the plug is inserted as illustrated in FIG. 8. As pointed out the member 28 has a centering groove 11 with a triangular or prismatic cross section which groove extends into the linear path of the guide means 10 so that as the plug 22 is inserted in the guide means 10, a free end of the core 3 of the waveguide 21 is received in the centering groove 11 and deflected or bent so that it moves along the base of the centering groove 11 to a point for contact with a similar core of the plug inserted in the opposite or other plug guide means. As best illustrated in FIGS. 5 and 8, each of the side walls 27, 27 is provided with a pair of spaced or separated recesses 29 which form means for receiving and engaging a locking projection or dog 8 to hold the respective plug in the coupling section 9.

During insertion of a plug such as the plug 22', the movable portion 25 of the flap 5 will cover the opening 24 between the shanks 23, 23 until the portion 25 engages an upper edge of the side walls 27, 27 of the coupling section 9. At this time it will move away from the opening 24 between the shank portion as the insertion of the plug continues until it is received in one of the recesses such as 29 which causes engagement of the locking dog 8 to resist further movement. During the step of insertion, the free end of the core 3 is first engaged in a centering groove 11 and with further movement of the plug toward the position illustrated in FIG. 8, the free end is deflected or bent to move along the base of the centering groove 11. Due to the bending of each of the core portions 3, compensation for excess length of the core portion will automatically occur. In addition, the bending increases the contact pressure between the ends of the two cores 3 as they come in contact with each other.

After insertion of the first plug 22', the second plug is inserted in the other guide means and movable portion 25 of the flap 5 will move away from the position closing the opening 24 as it is engaged on the edges of the side walls 27, 27. As illustrated, the dog 8 will ride over the previously secured portion 25 so that the dog 8 of the second inserted plug is engaged in the recess or slot 7 in the portion 25 of the flap of the first insertion plug 22'. As illustrated, each of the flap portions adjacent the dog 8 is provided with a cam or bevel surface to facilitate the assembly operation and the side walls of the coupling section 9 may be also provided with cam portions to facilitate movement of the dog 8 into the desired recess 29. With the insertion of the second plug, the connecting operation is completed and it is noted that no additional assembly or measurement means whatsoever were necessary. The means forming the centering groove 11 can also receive an immersion fluid or substance at the point of contact between the two free ends of the cores 3 to improve the optical connection.

To facilitate joining a plurality of the devices 20 in juxtaposition, each of the coupling sections 9 is provided with means to facilitate joining such as bores 30 which may receive coupling means such as bolts to hold two or more sections 9 in juxtaposition so that a multiple plug unit may be formed.

It should be noted that in FIG. 5 the centering groove 11 was formed in the portion 28. In the device illustrated in FIG. 8, the centering groove was formed by a separate member 31 which is supported on the portion 28.

While the centering groove 11 is illustrated in FIGS. 5 and 8 as having a straight line bottom 32, an advantage is obtained by having a centering groove 11b with a bottom 32b with a concave curvature in a longitudinal direction as illustrated in FIG. 10. As pointed out hereinabove, such a concave bottom 32b eliminates the possibilities of the core or fibers 3 from springing out of the contacting position as the plugs are inserted into the coupling section.

In addition, as mentioned hereinabove, each of the plugs 22 may be provided with more than one parallel extending waveguides such as the plug 22a in FIG. 4A. In such an instance, the coupling section 9a (FIG. 11) will have means for providing a centering groove 11a for each of the waveguides 21 carried in the plug. As illustrated in FIG. 11, two centering grooves 11a are provided to align the two fibers 3 of the plug 22a.

Figure 9:
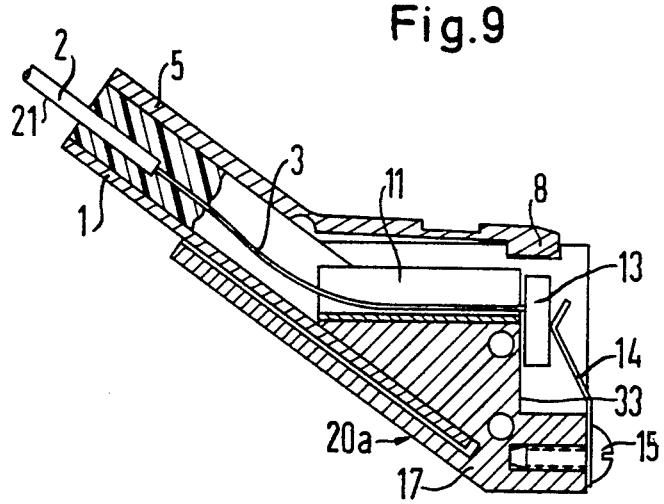
FIG. 9 is a longitudinal cross-sectional view of a modification of a coupling device in accordance with the present invention.

In above described embodiment, the optical component was another waveguide which was received in another plug such as 22. As illustrated in FIG. 9, the coupling device 20a is provided for detachably connecting a core 3 of a waveguide 21 in a plug 22 with an optical component 13, which may be either a transmission or reception diode and is supported on a coupling section 17. The plug 22 is constructed in the same manner as the plugs in the previously discussed embodiment. The coupling section 17 has a plane surface 33 which extends perpendicular to the bottom 32 of the centering groove 11 and as illustrated effectively reduces the size of the coupling section 17 into half the size of that of the coupling section 9. The optical component 13 is supported on the surface 33 with its active surface being substantially perpendicular to the axis of the core 3 in the groove 11, which core 3 will then lie on the optical axis of the active surface. To hold the component 13, means comprising a spring element such as 14 secured on the coupling section 17 by a threaded fastener 15 are provided. If necessary, the end of the centering groove 11 may be closed off or terminated with a glass clear plane plate on which the component 13 will be held. The step of forming the connection by inserting the plug 22 is the same as in the previous embodiment.

In conclusion, as pointed out hereinabove, the means forming the centering groove 11 can comprise a groove formed in a recess of the coupling sections such as illustrated in FIG. 5 or can be a separate element such as 31 of another type of material which is mounted in the coupling section. The device of the present invention can be utilized as a customary splicing element for two waveguides such as optical fibers. Since all of the parts of the device only require tolerances within wide limits, a simple and inexpensive production of the device by an injection molding process or by similar processes is possible so that the cost of producing the device as well as the cost of utilizing the device is minimal.

Although various minor modifications may be suggested by those versed in the art, it should be understood that I wish to embody within the scope of the patent warranted hereon all such modifications as reasonably and properly come within the scope of my contribution to the art.

I claim:

1. A device for detachably connecting at least one light waveguide having a protective sheathing to another light waveguide, said device comprising a coupling section and a pair of plugs, each of said pair of plugs comprising a base member having a trough-shaped cross section with a pair of spaced, upstanding shanks at one end of the base member and a flap member secured to said base member with a portion covering the space between the pair of shanks at said one end of the base member and being movable from a position covering said shanks, each of said plugs receiving at least one light waveguide and engaging the protective sheathing so that the waveguide is secured therein with a free end of the waveguide, which end has the protective sheathing removed, extending between the spaced shanks at said one end of the base member, said coupling section having a pair of separate means for guiding a plug in a linear path as it is inserted into the coupling section, each of said separate means for guiding being a plug guide having a trough-like cross section for slidably receiving the plug, and means forming a centering groove being disposed between the pair of plug guides and extending into the path of each plug at an acute angle thereto so that as each of the plugs is inserted into the coupling section, the free end of each of the waveguides secured therein is received in a centering groove and deflected thereby to move therealong to a position for forming an optical contact with a waveguide carried by the other plug of the pair of plugs.

2. A device according to claim 1, wherein the flap members include an integral hinge so that a portion is movable relative to the one end of the base member.

3. A device according to claim 1, wherein the movable portion is provided with a locking projection extending between the pair of spaced shanks of the base member, said locking projection being provided with a longitudinal groove for each of the light waveguides secured in the base member for receiving and engaging the light waveguide as the plug is removed from the coupling section.

4. A device according to claim 1, wherein the means forming a centering groove forms a groove having a bottom with a concave curvature in the longitudinal direction.

5. A device according to claim 1, wherein the plug is provided with a locking projection and wherein the couping section is provided with means for receiving the projection to hold the plug in the coupling section.

6. A device according to claim 1, wherein the means forming the centering groove forms means for receiving immersion substance to improve the connection between the waveguides.

7. A device according to claim 1, wherein each of the plugs receives at least two light waveguides which are secured therein, and the means forming the centering groove forms a centering groove for each of the waveguides received in one of the pair of plugs and aligned therewith.

8. A device according to claim 1, wherein each of the coupling sections is provided with means to facilitate joining a plurality of sections together in juxtaposition to form a multiple plug unit.

9. A device according to claim 1, wherein the flap member of each plug is provided with a locking projection extending between the pair of spaced shanks of the base member of the plug, each flap member having means for receiving a locking projection, and said coupling section having means for receiving the locking projection so that when the first of the two plugs is inserted in the coupling section, the locking projection thereof is received in the means for receiving of the coupling section, and the locking projection of the latter inserted plug is received in the means for receiving a locking projection on the flap member of the first inserted plug.

10. A device according to claim 9, wherein each of the locking projections has a longitudinal groove for each of the waveguides secured in the base member for receiving and engaging the free end of the light waveguide as the plug is removed from the coupling section.

* * * * *